US012805504B2

(12) United States Patent
Pimentel

(10) Patent No.: US 12,805,504 B2
(45) Date of Patent: Nov. 24, 2026

(54) ADHESIVE-BASED INSECT AND PEST ENTRAPMENT DEVICE

(71) Applicant: Jenny Pimentel, Denver, CO (US)

(72) Inventor: Jenny Pimentel, Denver, CO (US)

( * ) Notice: Subject to any disclaimer, the term of this patent is extended or adjusted under 35 U.S.C. 154(b) by 0 days.

(21) Appl. No.: 19/121,207

(22) PCT Filed: Apr. 2, 2024

(86) PCT No.: PCT/US2024/022629

§ 371 (c)(1),
(2) Date: Apr. 15, 2025

(87) PCT Pub. No.: WO2025/014550

PCT Pub. Date: Jan. 16, 2025

(65) Prior Publication Data

US 2026/0144246 A1 May 28, 2026

Related U.S. Application Data

(60) Provisional application No. 63/512,621, filed on Jul. 8, 2023.

(51) Int. Cl.
*A01M 1/14* (2006.01)
*A01M 1/10* (2006.01)

(52) U.S. Cl.
CPC ................ *A01M 1/14* (2013.01); *A01M 1/10* (2013.01)

(58) Field of Classification Search
CPC ........... A01M 1/14; A01M 1/18; A01M 1/185
(Continued)

(56) References Cited

U.S. PATENT DOCUMENTS 628,494 A * 7/1899 Schriever ................ A01M 1/14 43/115
3,913,259 A * 10/1975 Nishimura .............. A01M 1/02 43/121

(Continued)

FOREIGN PATENT DOCUMENTS

EP 1457111 A1 * 9/2004 ............ A01M 1/145
KR 20140013826 A * 2/2014 .............. A01M 1/02

OTHER PUBLICATIONS

International Search Report and Written Opinion issued in PCT Application No. PCT/US24/22629 on Aug. 2, 2024, 11 pages.

*Primary Examiner* — Christopher P Ellis
(74) *Attorney, Agent, or Firm* — Whiteford, Taylor & Preston LLP; Alexandra McGlynn

(57) ABSTRACT

The present invention relates to an adhesive cylinder/tube insect trap designed to address the challenges of traditional pest control methods. The trap features a substantially cylindrical form with enclosed ends, fully enveloped in a sticky adhesive substance, capable of ensnaring various types of insects upon contact. The invention includes a removable plastic cover that safeguards the adhesive layer, ensuring potency and stickiness are preserved until the moment of use. The cylindrical design offers versatility in placement, allowing the trap to be positioned in strategic locations, including corners, cabinet interiors, beneath appliances, or adhered to vertical surfaces. The discreet form factor allows the trap to blend seamlessly into its surroundings or remain hidden from view, making it an unobtrusive presence in both residential and commercial spaces. The invention provides an effective, environmentally safe, and user-friendly solution for insect and pest entrapment, emphasizing ease of use, aesthetic discretion, and environmental safety.

4 Claims, 7 Drawing Sheets

(58) Field of Classification Search
USPC .............................................................. 43/114
See application file for complete search history.

(56) References Cited

U.S. PATENT DOCUMENTS

| | | | | |
|---|---|---|---|---|
| 4,168,591 | A * | 9/1979 | Shaw | A01M 1/14 43/118 |
| 4,411,093 | A * | 10/1983 | Stout | A01M 1/145 43/114 |
| 4,577,434 | A * | 3/1986 | Davis | A01M 1/16 43/115 |
| 4,671,010 | A * | 6/1987 | Conlee | A01N 25/18 43/131 |
| 4,876,823 | A * | 10/1989 | Brunetti | A01M 1/14 43/124 |
| 4,908,976 | A * | 3/1990 | Dagenais | A01M 1/14 43/115 |
| 5,031,354 | A | 7/1991 | Olson | |
| 5,048,224 | A * | 9/1991 | Frisch | A01M 1/02 43/132.1 |
| 5,175,956 | A | 1/1993 | Hover, Sr. et al. | |
| 5,916,654 | A * | 6/1999 | Phillips | E04D 5/12 428/40.1 |
| 6,464,821 | B1 * | 10/2002 | Phillips | E04D 5/12 156/247 |
| 6,966,142 | B1 * | 11/2005 | Hogsette | A01M 1/2016 43/107 |
| 6,998,133 | B2 * | 2/2006 | Simpson | A01M 1/02 424/407 |
| 8,250,803 | B1 | 8/2012 | Kanno et al. | |
| 10,178,862 | B1 * | 1/2019 | Pickrell | A01M 3/00 |
| 10,772,314 | B1 * | 9/2020 | Caba | A01M 1/145 |
| 11,297,817 | B2 | 4/2022 | Bost | |
| 12,471,587 | B2 * | 11/2025 | Pimentel | A01M 1/14 |
| 2005/0235555 | A1 | 10/2005 | Hurwitz | |
| 2006/0248783 | A1 * | 11/2006 | Lindquist | A01M 1/145 43/113 |
| 2010/0043275 | A1 | 2/2010 | Battick | |
| 2013/0067795 | A1 * | 3/2013 | Wesson | A01M 1/2016 43/107 |
| 2013/0067797 | A1 * | 3/2013 | Aroniss | A01M 1/14 229/5.5 |
| 2013/0312313 | A1 | 11/2013 | Lefkowitz et al. | |
| 2018/0295832 | A1 | 10/2018 | Chazalet et al. | |
| 2019/0200596 | A1 | 7/2019 | Natale | |
| 2019/0350184 | A1 * | 11/2019 | Chang | A61L 9/20 |
| 2021/0000099 | A1 * | 1/2021 | Schmitt | A01M 1/10 |
| 2023/0301291 | A1 | 9/2023 | Zhang et al. | |
| 2023/0371494 | A1 * | 11/2023 | Zhang | A01M 23/005 |
| 2023/0380401 | A1 * | 11/2023 | Di Bono | A01M 1/04 |

* cited by examiner

ADHESIVE-BASED INSECT AND PEST ENTRAPMENT DEVICE

FIELD OF THE INVENTION

The present invention pertains to the field of pest control devices, specifically to an apparatus designed for the entrapment and extermination of insects. The invention falls under the category of non-toxic trapping solutions that prioritize ease of use, environmental safety, and discretion in residential and commercial settings.

BACKGROUND OF THE INVENTION

The field of insect control and management has long been challenged by the need to effectively trap and eliminate pests such as roaches, ants, spiders, and other crawling insects in both residential and commercial settings. Traditional methods have employed various forms of traps, including flat or square sticky traps with adhesive surfaces, gels for filling crevices, and tubular devices with internal adhesive bands. However, these conventional solutions often present limitations in terms of placement versatility, aesthetic discretion, and ease of use.

Prior art in the realm of insect and pest control has predominantly featured sticky traps with flat or square configurations, where the adhesive component is applied either on the inside or the top surface. While these designs have proven somewhat effective in capturing insects, their utility is significantly constrained by their shape and the placement of the adhesive. The flat or square design necessitates that these traps be used on upright flat surfaces, such as walls or countertops, limiting their versatility. This inherent design limitation restricts the placement options available to users, often rendering the traps ineffective in areas where insects are prevalent but where flat surfaces for mounting are not available. Moreover, the visibility of such traps can be aesthetically displeasing, and their fixed positioning makes them less adaptable to the dynamic and often concealed pathways insects travel within a space. Consequently, there is a clear need for an insect trap that overcomes these limitations, offering a more flexible and discreet solution to insect control.

In addition to the limitations of flat and square sticky traps, the pest control market has offered gel-based traps as a solution for filling gaps and crevices where insects commonly infiltrate. While these gel traps serve a functional purpose by targeting hard-to-reach areas, they introduce a new set of problems. The visibility of gel applications can be unsightly, detracting from the cleanliness and overall aesthetic of a space, which is particularly undesirable in areas frequented by guests or customers. Furthermore, as the efficacy of the gel diminishes over time, it often leaves behind a residue that is not only unattractive but also necessitates a subsequent cleaning effort. This residual stickiness can attract dirt and debris, compounding the issue and increasing maintenance requirements. The labor and time involved in cleaning these residues can be significant, thus presenting a notable inconvenience for users. Therefore, there is a pressing need for an insect control solution that maintains the effectiveness of gel-based traps without their visual and residual drawbacks. The prior art, as exemplified by U.S. Pat. Nos. 11,297,817, 5,031,354, 5,175,956, and 8,250,803, and the patent applications published as US20190200596A1, US20130312313A1, US20230301291A1, US20100043275A1, US20180295832A1, each of which is incorporated by reference in their entirety, reveals various approaches to insect trapping. These include flat structures with adhesive layers, encapsulated adhesives or attractants, tubular designs with internal adhesive bands, and corrugated panels with adhesive channels. While these designs address certain aspects of insect trapping, they often fall short in providing a discreet, versatile, and user-friendly solution.

Despite the variety of insect trapping solutions available in the market, several unmet needs persist. Many insect traps, especially those designed for domestic use, are often visible and can be unsightly, drawing unwanted attention to the presence of pests. Homeowners and businesses alike seek solutions that can blend into the environment or be hidden from view while still effectively capturing insects. There remains a need to provide a discreet trapping method that can be placed unobtrusively in various settings, from kitchen corners to behind furniture, without compromising the aesthetic appeal of the space.

Traditional traps are limited by their design to certain placements and orientations, often requiring flat surfaces for proper adherence. This limitation reduces their effectiveness in areas where insects commonly travel but where flat surfaces are not available. There remains a need for versatility in placement of insect trapping apparatuses, including on vertical surfaces or suspended positions, expanding the potential for capturing insects in their natural pathways.

Many existing traps require careful handling, either due to the exposure of adhesive surfaces or the need for cleaning after use. Users desire a solution that is simple to deploy and maintain, with minimal direct interaction with the adhesive component and no requirement for post-use cleaning. There remains a need in association with insect and pest trapping devices that the adhesive or trapping surface is exposed only when needed. Further, there remains a need for the entire pest capture unit can be disposed of after use with the captured pests, offering a low maintenance solution.

Moreover, safety concerns, particularly in households with children and pets, drive the need for non-toxic and safe insect and pest trapping methods. Chemical-based traps pose risks of exposure to harmful substances, while traditional sticky traps can inadvertently capture non-target creatures. There remains a need associated with providing a safe, adhesive-based trapping mechanism without the use of chemicals, reducing the risk to non-target species and ensuring a safer environment for all occupants.

SUMMARY OF THE INVENTION

The invention enables a novel approach to insect control with its adhesive cylinder/tube trap, featuring a design that elegantly circumvents the constraints of traditional flat or square sticky traps and the unsightly nature of gel-based solutions. Aspects of the invention comprise a cylindrical tube with closed ends enveloped in a sticky adhesive, endowing it with the versatility to be placed in an array of strategic locations. Its discreet form allows it to blend seamlessly into its surroundings or remain hidden from view in association with its intended uses, making it an unobtrusive presence in both residential and commercial spaces.

The adhesive coverage associated with the preferred embodiment ensures that insects and pests such as roaches are effectively entrapped upon contact, regardless of where the trap is positioned. The apparatus's design is thoughtfully considered to be discreet, allowing for placement in various nooks and crannies without drawing attention. This feature is particularly beneficial in maintaining the aesthetic appeal of the environment while still serving its functional purpose.

The substantially cylindrical aspect associated with the preferred embodiment is further enhanced with a removable plastic cover that safeguards the adhesive until the moment of use. This cover is thoughtfully designed in the context of the preferred embodiment as a system, with a perforated cut along its side, facilitating easy removal and activation of the trap. Once the trap has served its purpose and has retained insects and/or pests to its adhesive coating, it can be disposed of effortlessly, mitigating the need for unpleasant cleaning or handling of pests.

The invention disclosed herein provides as an effective, environmentally safe, and user-friendly solution for insect and pest entrapment. It emphasizes ease of use, aesthetic discretion, and environmental safety, filling a significant gap in the pest control market. By offering a non-toxic method of trapping that can be adapted to various settings and requiring minimal upkeep, the invention represents a novel advancement associated with insect and pest management.

DETAILED DESCRIPTION OF THE INVENTION

The preferred embodiment of the invention introduces an innovative insect and pest trapping apparatus 500 designed to address the challenges and limitations of conventional pest control methods. This apparatus 500, characterized by its unique straw-shaped cylindrical form, evolves the approach to insect and pest entrapment by offering a design that is both discreet and versatile in its application. The preferred embodiment of the invention comprises a tube-like structure with enclosed ends, which is fully enveloped in a sticky adhesive substance, capable of ensnaring various types of insects upon contact. A key feature of this embodiment is the inclusion of a removable plastic cover 120 that safeguards the adhesive layer 110, ensuring its potency and stickiness are preserved until the moment of use.

Figure 1:
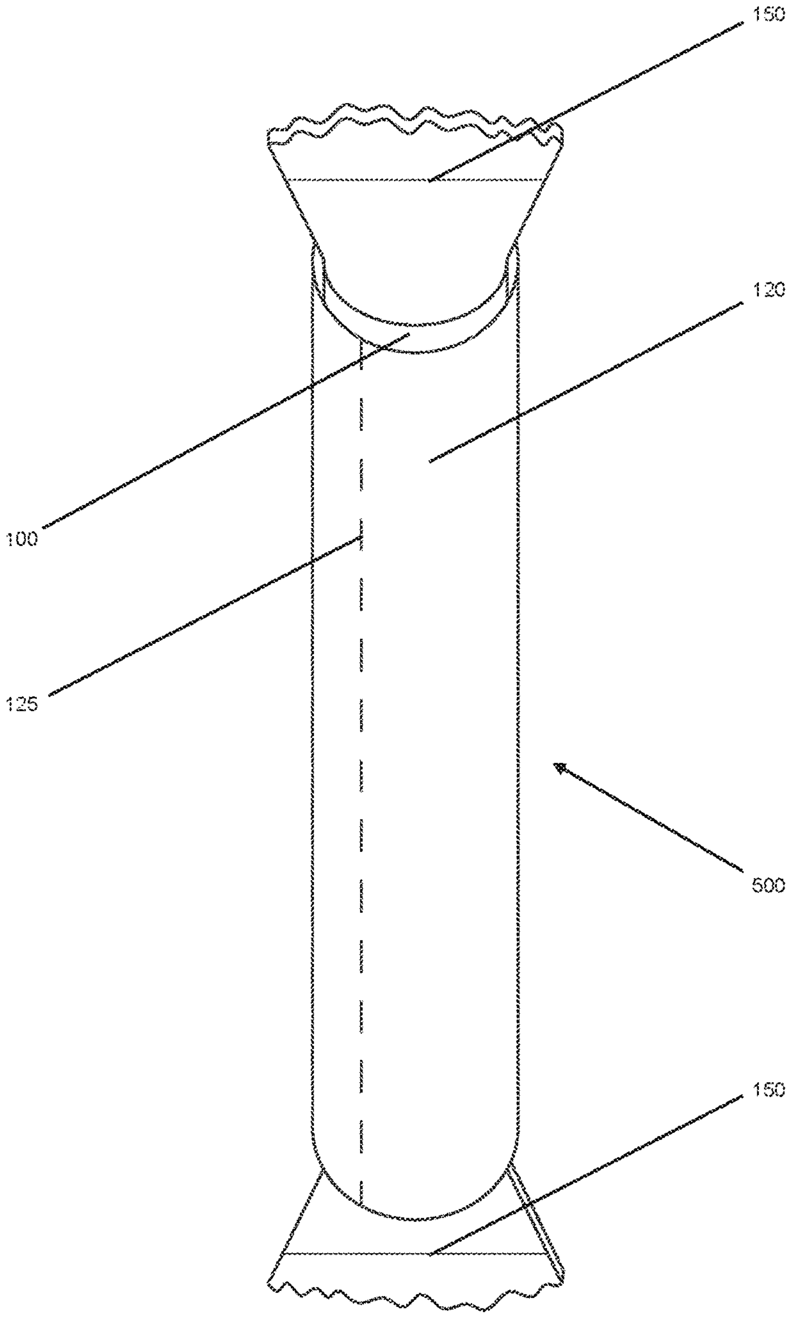
FIG. 1 depicts a side view of the apparatus with the plastic cover in place.
Figure 2:
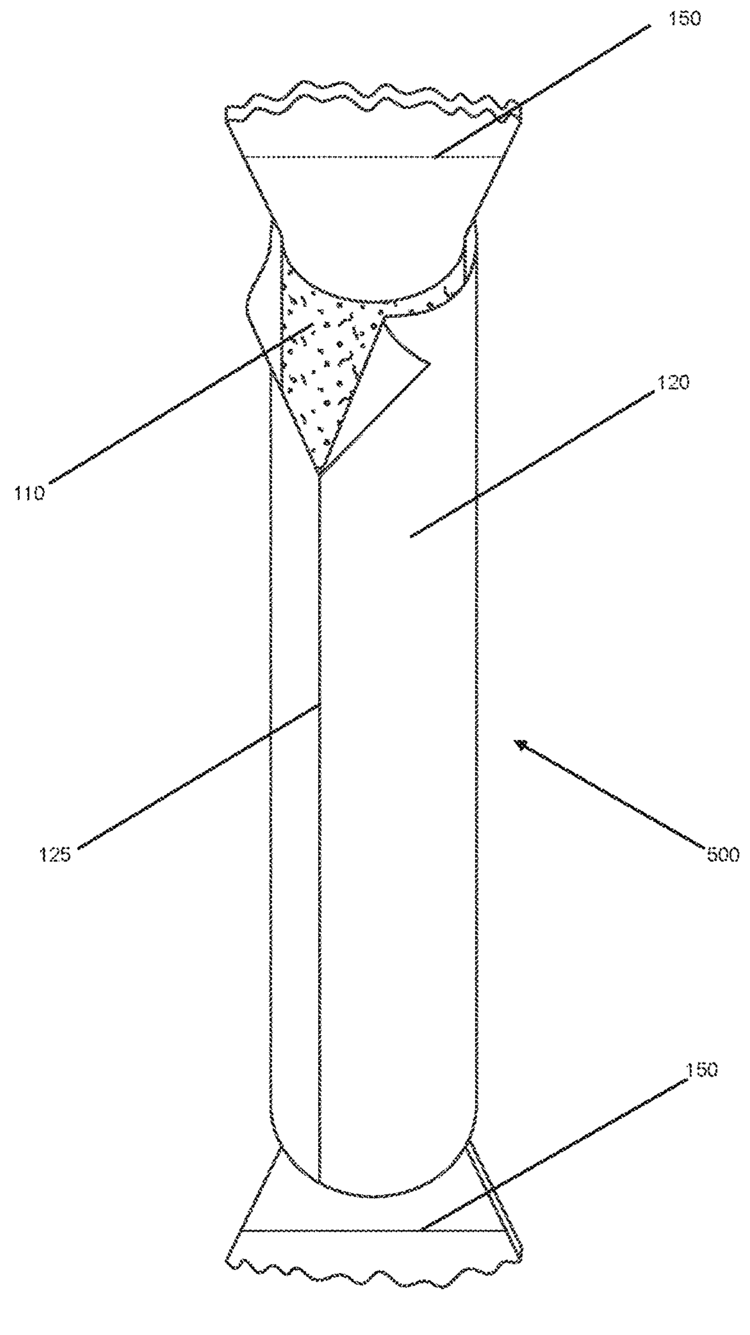
FIG. 2 depicts a side view of the apparatus with the plastic cover partially removed.
Figure 3:
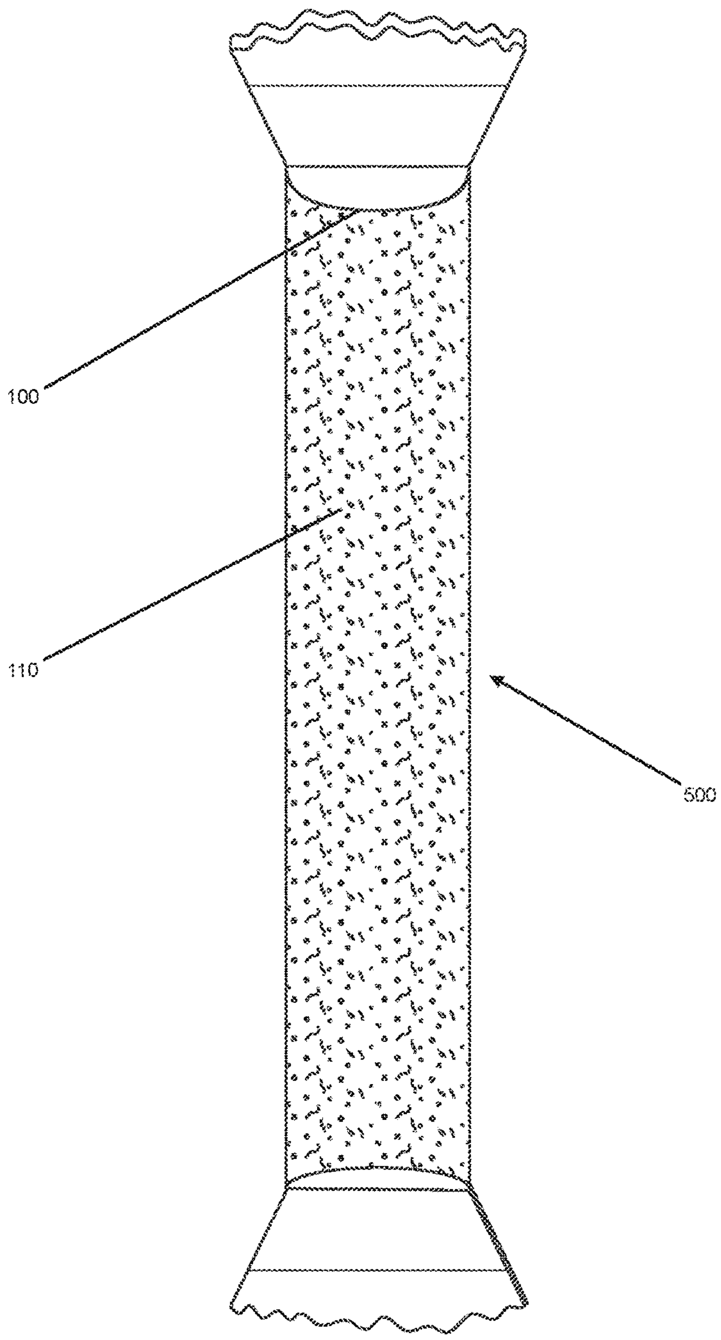
FIG. 3 depicts a side view of the apparatus with the plastic cover fully removed and the adhesive layer exposed.
Figure 4:
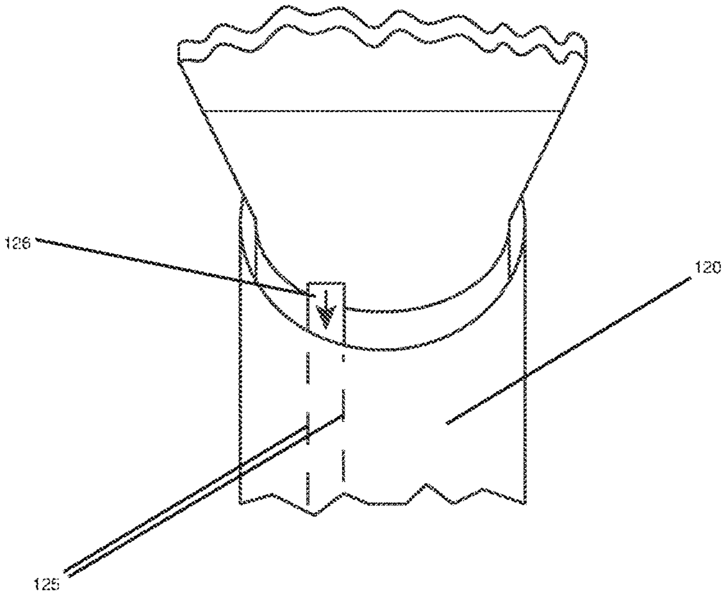
FIG. 4 depicts the apparatus placed horizontally upon a furnishing in accordance with a preferred method of use.
Figure 5:
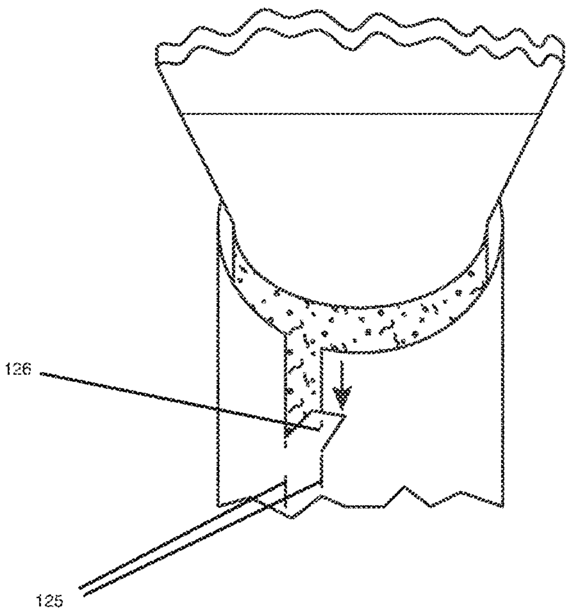
FIG. 5 depicts the apparatus placed vertically upon a furnishing in accordance with a preferred method of use.
Figure 6:
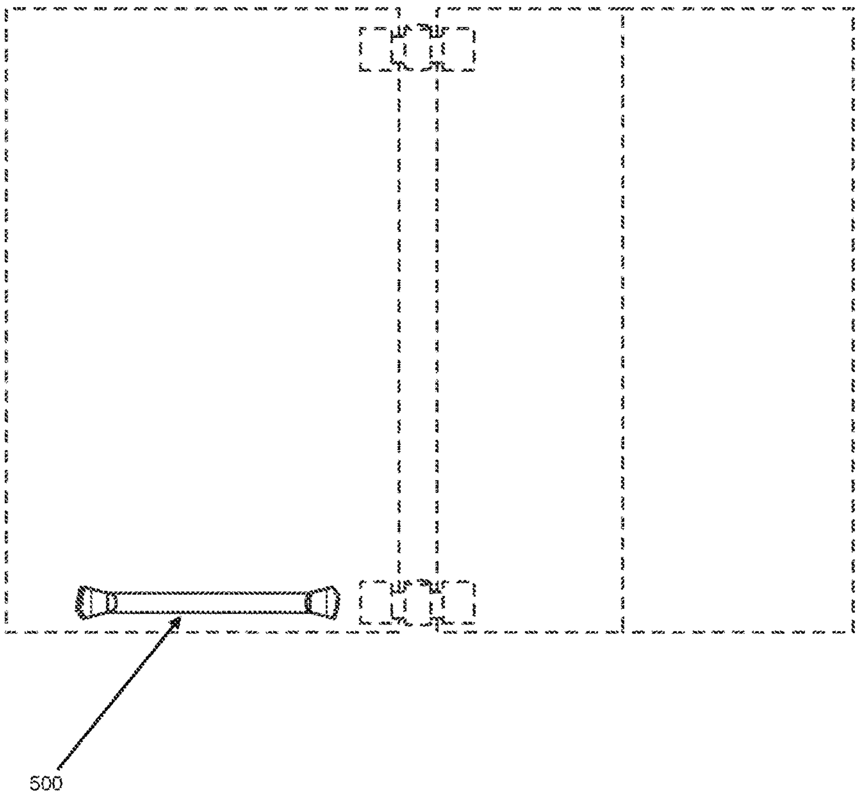
FIG. 6 depicts placement of an exemplary embodiment in a horizontal configuration in association with an intended use.
Figure 7:
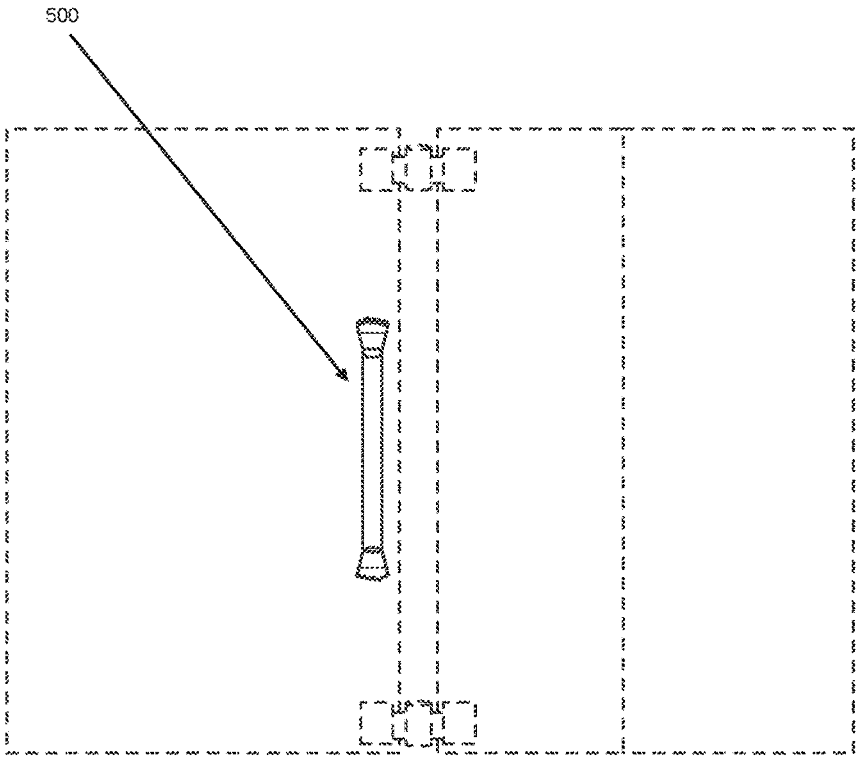
FIG. 7 depicts placement of an exemplary embodiment in a vertical configuration in association with an intended use.

Unlike traditional flat or square sticky traps that are limited to placement on upright flat surfaces, the inventive apparatus 500 can be strategically positioned in a multitude of locations, including but not limited to corners, cabinet interiors, beneath appliances, or even adhered to vertical surfaces as depicted in FIGS. 4 & 5. This flexibility in placement is not only advantageous for capturing insects in their common routes but also allows the apparatus 500 to be concealed from view in association with intended uses, maintaining the aesthetic integrity of the environment in which it is deployed.

The inventive aspects associated with the preferred embodiment address the need for discretion through its cylindrical tube design, which inherently offers a more subtle and less obtrusive presence compared to traditional flat or square sticky traps. The tubular shape of the invention allows it to be placed in a variety of locations without drawing attention to itself, blending seamlessly with the environment. The present inventor has recognizes that this discreet form factor is particularly advantageous in settings where visual appeal is important, such as in residential homes, hospitality venues, or retail spaces.

The cylindrical tube 100 is designed with a compact diameter, making it small enough to be positioned unobtrusively along baseboards, behind furniture, under appliances, or within plant pots. Its rounded profile minimizes the visual footprint, allowing the trap to become virtually invisible when viewed from certain angles. The tube 100 can also be tucked away in discreet locations where pests are known to traverse but are less likely to be noticed by occupants or visitors, such as behind door frames, within utility closets, or along window sills.

In association with an exemplary implementation, to further enhance the discreet nature of the invention, the exterior surface of the tube 100, which is coated with an adhesive layer 110, can be colored or patterned to match common household materials like wood, tile, or carpet. This camouflage effect allows the trap to blend into the background, reducing visual detection while still effectively capturing insects that come into contact with it.

Additionally, the sealed ends of the tube 100 ensure that the adhesive layer 110 does not extend beyond the trapping surface, maintaining a clean and tidy appearance. The lack of exposed adhesive layer 110 contributes to the discreet profile of the trap in its preferred embodiment, as there are no messy or sticky edges that might otherwise catch the eye or adhere to unintended objects.

The preferred embodiment facilitates easy disposal, allowing users to discard the entire unit after it has served its purpose, thus eliminating the need for post-use cleaning or handling of trapped insects or other pests. The choice of materials for the cylindrical or tubular aspect of the apparatus 500, including options such as polymers, paper, organic, or inorganic substances, caters to diverse user preferences and environmental considerations, further enhancing the appeal of the invention.

The preferred embodiment's straw-shaped design with enclosed ends presents a significant advancement over prior art by offering a trapping device that is not only effective but also discreet and adaptable to various settings. The removable plastic cover 120 is a novel addition that addresses the common issue of adhesive layer 110 exposure and degradation in existing traps, ensuring that the adhesive layer 110 remains effective until the point of application. This feature alone sets the preferred embodiment apart from prior art, providing a clear advantage in terms of maintaining the functionality and efficacy of the trap.

Moreover, the preferred embodiment's adaptability in terms of materials used for construction allows for an environmentally friendly approach to pest control, a consideration that is increasingly important to modern consumers. The ability to customize the length of the adhesive layer 110 and cylinder further underscores the preferred embodiment's superiority over prior art, as it offers a level of personalization and flexibility in use that is unmatched by traditional insect traps.

The construction of the preferred embodiment is centered around a cylindrical tube 100 that serves as the core structure for the insect trapping apparatus 500. This tube 100 is fabricated from durable and lightweight materials, such as cardboard, plastics, and/or high-density polymers, which provide the necessary rigidity while allowing for flexibility in placement. In an embodiment, the tube 100 further comprises ridges and recesses. The choice of material ensures that the tube 100 can maintain its shape and adhesive layer 110 properties under various environmental conditions, including humidity and temperature fluctuations commonly encountered in both indoor and outdoor settings.

The exterior surface of the tube 100 in the preferred embodiment is uniformly coated with a specially formulated adhesive substance forming the adhesive layer 110. This adhesive substance is selected for its long-lasting tackiness and resistance to drying out, ensuring that it remains effective over extended periods. The adhesive layer 110 is thick enough to trap insects upon contact but is designed to prevent deep embedding of the pests, facilitating easy disposal of the tube 100 once it is filled with trapped insects.

The adhesive layer 110 associated with the preferred embodiment exhibits enduring stickiness, a critical feature that ensures the trap remains active and capable of capturing insects over time without the need for frequent replacement. Suitable adhesives for use within the adhesive layer 110 for this purpose may include, but are not limited to, pressure-sensitive adhesives such as polyisobutylene or polybutene-based compounds, which are known for their persistent viscous properties and resistance to environmental factors that typically cause adhesives to lose their effectiveness. The application of the adhesive layer 110 is performed to achieve a uniform layer that is sufficiently thick to secure insects upon contact. The adhesive layer's 110 optimal thickness might range from a few microns to several millimeters, depending on the specific adhesive used and the types of insects or pests targeted. The selection of the adhesive compound for use within the adhesive layer 110 involves considering factors such as the adhesive compound's longevity, its resistance to environmental conditions, and its safety for use around humans and pets. The compounds chosen are typically pressure-sensitive adhesives that remain tacky at room temperature and do not require activation by water, solvents, or heat. These adhesives are formulated from synthetic rubber or acrylic polymers, which are known for their strong and durable bonding properties. Additionally, the adhesives are tested to ensure they do not contain substances that could be harmful if used in indoor environments, such as volatile organic compounds (VOCs) that could off-gas into living spaces.

Alternative embodiments could incorporate a range of adhesive types within the adhesive layer 110 to address specific pest control scenarios. For example, some adhesive types may be formulated to be more or less resistant to temperature variations, making them suitable for outdoor use or in environments with fluctuating temperatures. Other adhesive types might be designed to be water-resistant, allowing the traps to be used in damp areas such as bathrooms or basements without losing their stickiness. Furthermore, adhesive types with different levels of tackiness could be employed to target specific insects and pests, with some requiring a stronger bond to prevent escape.

Embodiments of the invention may incorporate insect attractants within or adhered to the tubular body or on the adhesive layer 110 to enhance the trap's effectiveness. These attractants could be species-specific pheromones or general food-based scents. An embodiment could include a replaceable attractant cartridge that users can swap out to target different types of insects.

To protect the adhesive layer 110 from contamination and premature exposure, the tube 100 is encased in a removable plastic cover 120. This cover 120 is designed to conform closely to the cylindrical shape of the tube 100, providing a barrier against dust, debris, and accidental contact. The plastic cover 120 is manufactured from a non-reactive material that does not compromise the adhesive layer 110's properties and is easy to remove without leaving any residue on the adhesive layer 110 surface.

The plastic cover 120 enveloping the adhesive layer 110 covering the tube 100 serves as a protective shield until the trap is ready for use in accordance with teachings of the inventions. This cover 120 is crafted to fit snugly around the substantially cylindrical form of the tube 100, ensuring that the entire adhesive layer 110 surface is shielded from external contaminants such as dust and debris, which could otherwise diminish the adhesive layer 110's effectiveness. Additionally, the cover 120 prevents inadvertent contact with the adhesive layer 110, preserving its stickiness for when it is most needed.

The material selected for the plastic cover 120 must be non-reactive so as not to interact chemically with the adhesive layer 110, which could potentially alter its trapping properties. Suitable plastics for the cover 120 include polyethylene, polypropylene, and polyester films, known for their inertness and stability. These materials are also favored for their clarity, allowing users to see the adhesive layer 110 beneath and assess the trap's condition without needing to remove the cover 120. The cover 120 is designed with a perforated edge 125 or a tear strip that allows users to easily initiate the removal process.

The design of the plastic cover 120 in its preferred embodiment incorporates a user-friendly perforated edge 125 or tear strip, which serves as an initiation point for the removal process, ensuring that users can easily access the adhesive layer 110 surface of the tube 100 when needed. This perforated edge 125 is precisely engineered along the length of the cover 120, with perforations spaced at intervals that balance ease of tearing with the integrity of the cover 120 during handling and storage. The tear strip is typically a narrow section along the cover 120, created using a die-cutting process that partially cuts through the plastic material, allowing for a clean and straight tear without the need for additional tools. The placement of the tear strip is strategically positioned to be readily accessible and may feature a slight overhang or tab that users can grip between their fingers. This tab can be further enhanced with a non-slip texture or a visually contrasting color to guide the user. The combination of these features ensures that the removal of the cover 120 is a simple and intuitive process, allowing for quick preparation of the trap for use while minimizing the risk of accidental contact with the adhesive layer 110.

In association with varying embodiments, the mechanism for applying the plastic cover 120 to the tube 100 is designed for efficiency and ease of use. One common method is the use of a heat-shrink film that conforms to the tube 100's shape when heat is applied, creating a tight seal without the need for adhesives. Another approach is the use of pre-sized plastic sleeves that can be slipped over the tube 100 and sealed at one end or both ends forming a seal 150, either through heat sealing or with an adhesive strip that does not interact with the tube 100's adhesive layer 110. For user convenience, the cover 120 may incorporate a perforated tear line 150 and/or a pull-tab 126, enabling quick and clean removal. The pull-tab 126 can be an extension of the plastic cover 120 itself or a separate component affixed to the cover during the manufacturing process. As depicted in FIGS. 4 &

5, embodiments may combine the use of a pull-tab 126 with one or more perforated tear lines 125.

The application of the plastic cover 120 is typically performed during the final stages of the tube 100's production. After the adhesive layer 110 has been applied to the tube 100, the cover 120 is placed over it using automated equipment that ensures precision and consistency. The cover 120 is then secured in place, either through the aforementioned heat-shrink process or by sealing the open end, resulting in a fully enclosed, ready-to-use insect trap.

The ends of the tube 100 are sealed in association with the preferred embodiment to prevent ingress of debris and pests, and to maintain the structural integrity of the tube 100 during handling and placement. The sealed ends also contribute to the discreet appearance of the trap, as they give the tube 100 a finished look that more easily blends seamlessly into various environments. Alternative embodiments could include tubes comprising exterior surfaces that mimic common household textures or patterns, such as wood grain, tile, or fabric. These designs would allow the traps to blend into their surroundings more effectively, making them less noticeable to occupants and preserving the visual appeal of the space. The tubes 100 could also be produced in a variety of colors to match different decors, further enhancing their discreet nature.

To enable the construction of the preferred embodiment, the cylindrical tube 100 is produced using an extrusion process that allows for precise control over the tube's 100 diameter and wall thickness. The extrusion process is calibrated to produce tubes 100 with a uniform exterior surface that is optimal for adhesive layer 110 application. Once extruded, the tubes 100 are cut to standard lengths suitable for common use cases, although they can also be customized to specific lengths as required.

The dimensions of the cylindrical tube 100 in the preferred embodiment are meticulously defined to cater to a wide range of use cases while ensuring optimal functionality of the adhesive layer 110 surface. The tube's 100 diameter is typically set within a range that allows for easy handling and placement, commonly between 0.5 to 2 inches, providing a sufficient surface area for effective insect capture without being obtrusive. The wall thickness of the tube 100 is engineered to provide structural stability, generally ranging from 0.01 to 0.05 inches, which ensures the tube 100 maintains its shape during handling and when insects are ensnared. Standard lengths of the tubes 100 are determined based on typical application areas and user convenience, with common lengths being between 6 to 12 inches, allowing for adequate coverage in areas such as window sills, countertops, or along baseboards. However, for specialized applications, the tubes 100 can be extruded to custom lengths, providing versatility for unique pest control scenarios or specific spatial requirements.

An alternative embodiment includes varied sizes and shapes of the tube 100 to accommodate different spaces and target insects and pests. For instance, smaller diameter tubes 100 could be designed for trapping smaller pests like ants or fruit flies, while larger tubes 100 could be effective against bigger insects such as cockroaches or spiders. The tubes 100 could also be produced in various lengths, allowing users to cut them to size or use them as is for broader coverage. Additionally, the tubes 100 could be designed with flat sections to enable secure placement on ledges or window sills, or with flexible materials that allow them to be bent around corners or contoured surfaces without compromising the adhesive layer 110's effectiveness in alternative embodiments.

Further alternative embodiments feature a modular design, where the tube 100 is composed of interlocking segments that can be assembled to create a trap of the desired length. This design would offer flexibility in trap size while minimizing waste, as users could disassemble and reuse segments as needed. The interlocking mechanism would be designed to maintain the structural integrity of the tube 100, ensuring that the adhesive layer 110 surface remains continuous and effective along the entire length of the assembled trap.

The application of the adhesive layer 110 substance onto the exterior surface of the tube 100 is performed during the manufacturing process of the trap in association with the preferred embodiment. To achieve a consistent and uniform coating, a controlled coating process is employed. This process may involve the use of precision equipment such as automated adhesive dispensers that apply a steady stream of adhesive as the tube 100 rotates, ensuring that the entire exterior surface is covered evenly. The rate of adhesive flow, the speed of rotation, and the nozzle size of the dispenser are all calibrated to achieve the desired thickness of the adhesive layer 110 without over-application.

The ends of the tube 100 are sealed prior to the adhesive layer 110 application to prevent the adhesive layer 110 from capping the ends, which could hinder the trap's performance and complicate disposal. This sealing of the tube 100 ends can be achieved through various methods in association with various relevant methods of production, such as heat sealing or using end caps that fit snugly onto the ends of the tube 100. The sealed ends also serve to maintain the structural integrity of the tube 100, ensuring that it does not collapse or deform during the coating process.

The controlled coating process, combined with the careful selection and testing of the adhesive compounds comprising the adhesive layer 110, results in a tube 100 that forms a key component of an embodiment that is reliable, effective, and safe for use in a variety of settings, and which can be strategically placed to capture pests, providing a non-toxic solution to pest control challenges in homes and businesses.

The final assembly of the tube 100 in an embodiment includes the attachment of a label or indicator that provides users with instructions for use and removal of the plastic cover 120. This label may also contain information about the adhesive layer 110's active life and any safety precautions necessary for handling the trap.

To enhance user interaction and efficiency, an alternative embodiment of the trap integrates smart technology to provide real-time updates on the trap's status. This advanced version of the trap includes a sensor system embedded within or attached to the tube's 100 structure. The sensor is designed to detect when the adhesive layer 110 surface is covered by insects to a certain degree, which is indicative of the trap's success and capacity status.

In an exemplary implementation of the trap featuring such smart technology, the sensor could be an optical sensor that monitors changes in the surface texture of the adhesive layer 110, a weight sensor that detects increases in mass as insects are captured, or a capacitive sensor that senses when the adhesive layer 110 surface area is obstructed. Upon detecting that the adhesive layer 110 surface is covered to a predetermined threshold, the sensor activates a communication module within the trap.

In such example, the communication module is equipped with wireless connectivity, such as Wi-Fi, Bluetooth, NFC, or Zigbee, enabling it to send an alert to a connected device. This device could be a smartphone, tablet, or computer, where a dedicated application receives and processes the alert. The application would provide users with a notification that the trap has reached its capacity or effectiveness limit, signaling that it is time to check the trap and potentially replace it with a new one.

To provide this smart functionality, the trap's design incorporates a power source, such as a battery or energy-harvesting component, that supplies the necessary energy to the sensor and communication module. The power source is chosen for its longevity and compatibility with the trap's expected lifespan, ensuring that the smart features remain operational throughout the trap's effective period.

The inclusion of smart technology within the insect trap not only enhances the user experience by reducing the need for manual monitoring but also contributes to more efficient pest management. Users can be more responsive to the trap's status, ensuring that the trap is always functioning optimally. Additionally, the application could provide users with insights into peak insect activity times and patterns, further aiding in strategic trap placement and pest control planning.

Preferred Methods of Use

The preferred embodiment is an insect and pest catching apparatus 500 designed to effectively control insect and pest populations within a space by strategically placing the apparatus 500 coated in an adhesive layer 110 in areas where insects are known to travel or congregate. To employ the preferred embodiment, users should first identify common travel pathways, such as along baseboards, near entry points like windows or doors, in corners, or close to food sources in kitchens. Once these areas are pinpointed, the apparatus 500 can be positioned to intercept the insects and pests along such pathways in accordance with the preferred method of use.

The method of employing the preferred embodiment involves several steps to ensure maximum efficacy. Initially, the user removes the plastic cover 120 from the adhesive-coated tube 100 by tearing along the perforated edge 125 or tear strip, which exposes the sticky surface. Care should be taken to handle the tube 100 by the sealed ends to avoid contact with the adhesive layer 110. The user then takes the step of placing the tube 100 directly onto a surface or secures it in place using additional non-permanent fixtures if necessary, ensuring the tube 100 is stable and the adhesive layer 110 surface is unobstructed.

For comprehensive insect and pest control, the user may take the step of distributing multiple tubes 100 throughout the space, creating a barrier that insects and pests cannot bypass without becoming ensnared. The tubes' 100 discreet design, and ease of hiding, allows them to blend into the environment, making them less noticeable to occupants while remaining highly effective at capturing insects.

Over time, the tubes 100 will collect insects upon each adhesive layer 110, which can be easily monitored due to the transparent nature of the tube's 100 material in an embodiment. Once a tube 100 has accumulated a significant number of insects or the adhesive layer 110's effectiveness diminishes, it can be disposed of safely and replaced with a new one. The ease of disposal and replacement is a key feature of the preferred embodiment, allowing for continuous control of the insect population without the need for labor-intensive maintenance or cleaning.

The preferred embodiment's design and method of use is advantageous for several reasons. It provides a non-toxic alternative to chemical insecticides, making it safer for use in environments with children, pets, or food preparation areas. The adhesive layer 110 remains effective over an extended period, reducing the need for frequent monitoring or replacement. Additionally, the preferred embodiment's design allows for targeted placement, which can be adapted to specific insect behaviors and patterns within a given space.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. An insect trapping apparatus comprising a substantially cylindrical tube fabricated from a biodegradable material with enclosed ends, an eco-friendly adhesive substance applied to the exterior surface of said cylindrical tube, said adhesive substance being free of volatile organic compounds (VOCs), a removable plastic cover made from a non-reactive material, said cover designed with a tear strip for ease of removal, wherein said cylindrical tube is adapted for discreet placement in residential and commercial settings and is configured to entrap a variety of insects upon contact with the adhesive substance, wherein the cylindrical tube further comprises a smart sensor system capable of detecting the presence of trapped insects and communicating the trap's status to a user's connected device in real-time, wherein the cylindrical tube comprises: interlocking segments that can be assembled to create a trap of the desired length; a dual-function adhesive substance that both secures the tube to surfaces and captures insects; and wherein multiple cylindrical tubes can be connected together to increase the total adhesive surface area for enhanced insect capture capability.

2. The insect trapping apparatus of claim 1, wherein the smart sensor system includes an optical sensor for monitoring changes in the adhesive surface texture.

3. The insect trapping apparatus of claim 1, wherein the smart sensor system is powered by a battery or an energy-harvesting component integrated into the cylindrical tube.

4. The insect trapping apparatus of claim 1, wherein the smart sensor system is configured to send alerts to a user's connected device via a wireless communication protocol selected from the group consisting of Wi-Fi, Bluetooth, NFC, and Zigbee.

* * * * *